United States Patent
Takayanagi et al.

(10) Patent No.: US 8,308,325 B2
(45) Date of Patent: Nov. 13, 2012

(54) IMAGE PICKUP DEVICE-EQUIPPED REAR-VIEW MIRROR

(75) Inventors: Shinya Takayanagi, Shizuoka (JP); Masatoshi Nakamura, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 195 days.

(21) Appl. No.: 12/112,048

(22) Filed: Apr. 30, 2008

(65) Prior Publication Data

US 2009/0040778 A1  Feb. 12, 2009

(30) Foreign Application Priority Data

Aug. 7, 2007 (JP) ................. 2007-205415

(51) Int. Cl.
*B60Q 1/00* (2006.01)
*B60Q 1/26* (2006.01)
*B60R 1/12* (2006.01)
*G02B 1/10* (2006.01)

(52) U.S. Cl. ......... 362/494; 362/492; 359/586; 359/588
(58) Field of Classification Search ............... 362/492, 362/494; 359/586–588
See application file for complete search history.

(56) References Cited

U.S. PATENT DOCUMENTS

| | | | |
|---|---|---|---|
| 5,523,811 A | | 6/1996 | Wada et al. |
| 6,038,496 A | * | 3/2000 | Dobler et al. ................. 701/3 |
| 6,509,832 B1 | * | 1/2003 | Bauer et al. ............. 340/425.5 |
| 6,630,888 B2 | * | 10/2003 | Lang et al. ............. 340/815.45 |
| 6,703,925 B2 | * | 3/2004 | Steffel ................... 340/425.5 |
| 6,908,698 B2 | * | 6/2005 | Yoshida et al. ........... 428/697 |
| 2001/0022550 A1 | | 9/2001 | Steffel |
| 2003/0214733 A1 | * | 11/2003 | Fujikawa et al. .......... 359/838 |
| 2004/0252993 A1 | | 12/2004 | Sato |

(Continued)

FOREIGN PATENT DOCUMENTS

CA    2290182    7/2000

(Continued)

OTHER PUBLICATIONS

Japanese Standards Association, Mirrors for Automobiles (JIS D 5705), 1987, pp. 7-8.*

(Continued)

*Primary Examiner* — David J Makiya
(74) *Attorney, Agent, or Firm* — Greenblum & Bernstein, P.L.C.

(57) ABSTRACT

The present invention is intended to provide an image pickup device-equipped rear view mirror with improved image pickup performance, glare prevention and appearance (design) in addition to improved performance as a vehicle mirror. A mirror element is formed by forming a reflecting film consisting of high refractive index material films and a low refractive index material film on a back surface of a transparent glass substrate. The integrating sphere reflectance of the mirror element in the visible range is 40% to 60% and the near-infrared transmittance is no less than 70% for the whole or part of the band belonging to the near-infrared range within the entire sensitive wavelength range of the near-infrared camera. A black mask member is attached to an entire back surface of the reflecting film. The near-infrared camera is arranged behind the black mask member. The region corresponding to the area for the image-pickup by the near-infrared camera within the entire region of the black mask member is formed of a visible-light absorption and near-infrared transmission filter. The near-infrared transmittance of the visible-light absorption and near-infrared transmission filter is no less than 70% for the whole or part of the band belonging to the near-infrared range within the entire sensitive wavelength range of the near-infrared camera.

13 Claims, 7 Drawing Sheets

U.S. PATENT DOCUMENTS

| | | | |
|---|---|---|---|
| 2006/0202843 A1 | 9/2006 | Ota | |
| 2007/0052805 A1 | 3/2007 | Inagaki et al. | |
| 2007/0053085 A1* | 3/2007 | Shih | 359/839 |
| 2007/0058257 A1* | 3/2007 | Lynam | 359/604 |
| 2007/0127126 A1* | 6/2007 | Terada | 359/586 |

FOREIGN PATENT DOCUMENTS

| | | |
|---|---|---|
| CN | 2558550 | 7/2003 |
| EP | 1120313 | 8/2001 |
| JP | 57-144504 | 9/1982 |
| JP | 60-98405 | 6/1985 |
| JP | 5-294183 | 11/1993 |
| JP | 7-186831 | 7/1995 |
| JP | 2000-236468 | 8/2000 |
| JP | 2000-264128 | 9/2000 |
| JP | 2004-136760 | 5/2004 |
| JP | 2004-136762 | 5/2004 |
| JP | 2006-252138 | 9/2006 |

OTHER PUBLICATIONS

English language Abstract of JP 5-294183, Nov. 9, 1993.
English language Abstract of JP 7-186831, Jul. 25, 1995.
English language Abstract of JP 2000-264128, Sep. 26, 2000.
English language Abstract of JP 2000-236468, Aug. 29, 2000.
U.S. Appl. No. 12/138,538 to Nakayama et al, filed on Jun. 13, 2008.
Japan Office action, dated Aug. 2, 2011 along with an english translation thereof.
Japanese Office Action dated, Aug. 28, 2012.

* cited by examiner

CROSS-SECTIONAL PLAN VIEW

FRONT VIEW

IMAGE PICKUP DEVICE-EQUIPPED REAR-VIEW MIRROR

The disclosure of Japanese Patent Application No. JP2007-205415 filed on Aug. 7, 2007 including the specification, drawing and abstract is incorporated herein by reference in its entirety.

BACKGROUND OF THE INVENTION

1. Field of the Invention

The present invention relates to an image pickup device-equipped rear-view mirror in which an image pickup element is arranged behind a mirror element, and it provides improved image pickup performance, glare prevention and appearance (design), in addition to improved performance as a vehicle mirror.

2. Description of the Related Art

An image pickup device-equipped rear-view mirror in which an image pickup element is arranged behind a mirror element for the purpose of reducing the blind spot for a vehicle or monitoring the inside of the vehicle are proposed in Japanese Patent Laid-Open No. 5-294183, Japanese Patent Laid-Open No. 7-186831, Japanese Patent Laid-Open No. 2000-264128, and Japanese Patent Laid-Open No. 2000-236468. The techniques disclosed in Japanese Patent Laid-Open No. 5-294183 and Japanese Patent Laid-Open No. 7-186831 have an image pickup element in a door mirror, and also have a mirror element consisting of a half mirror, and it picks up an image of the sight of an area behind a vehicle by means of the image pickup element through the mirror element. The technique disclosed in Japanese Patent Laid-Open No. 2000-264128 has an image pickup element in an inner mirror, and also have a mirror element consisting of a half mirror, and it picks up an image of the sight of an area inside the vehicle by means of the image pickup element through the mirror element. Also, Japanese Patent Laid-Open No. 2000-264128 discloses that an infrared camera is used as the image pickup element, and that a cold mirror is used as the mirror element. The technique disclosed in Japanese Patent Laid-Open No. 2000-236468 has an image pickup element in a rear-view mirror, and also have a mirror element with its reflecting film removed at a part thereof, and it picks up an image of an area behind the vehicle by means of the image pickup element through the part in which the reflecting film has been removed.

According to a rear-view mirror using a half mirror, which is disclosed in Japanese Patent Laid-Open No. 5-294183, Japanese Patent Laid-Open No. 7-186831 and Japanese Patent Laid-Open No. 2000-264128, since the transmittance and the reflectance of a half mirror are incompatible with each other, it has been difficult to provide both a reflectance that meets the laws and regulations as a vehicle mirror and a transmittance for obtaining a sufficient image by means of an image pickup element. Also, according to a rear-view mirror using a cold mirror, which is disclosed in Japanese Patent Laid-Open No. 2000-264128, since a cold mirror has a reflectance close to 100% in the visible range, there is a problem in that headlight from behind makes a driver have the feeling of glare at night, obstructing the driver's safe driving. Furthermore, since a cold mirror has a large view angle dependency, the inside of the mirror may be seen through or a discontinuous part may arise in the tone of reflected light, depending on the position of the driver's viewpoint, and thus, there is also a problem of appearance (design). A rear-view mirror having a mirror element with its reflecting film removed at a part thereof, which is disclosed in Japanese Patent Laid-Open No. 2000-236468, has a problem in that the backward visibility may deteriorate since a part of the mirror element does not function as a mirror. Also, the mirror element with a part of its reflecting film removed has a problem of appearance (design).

The present invention has been made in view of the aforementioned points, and is intended to provide an image pickup device-equipped rear-view mirror with improved image pickup performance, glare prevention and appearance (design), in addition to improved performance as a vehicle mirror.

SUMMARY OF THE INVENTION

An image pickup device-equipped rear-view mirror according to an aspect of the present invention comprises: a mirror element; a dark color mask member arranged behind the mirror element; and a near-infrared camera arranged behind the dark color mask member, an optical axis of the near-infrared camera being directed to a surface of the mirror element via the dark color mask member, wherein: the mirror element has an integrating sphere reflectance of 40% to 60% in the visible range, and a near-infrared transmittance of no less than 70% for a whole or part of a band belonging to a near-infrared range within an entire sensitive wavelength range of the near-infrared camera; a near-infrared transmittance of at least a region of the dark color mask member where the near-infrared camera is arranged is no less than 70% for a whole or part of a band belonging to a near-infrared range within the entire sensitive wavelength range of the near-infrared camera; and the band for which the near-infrared transmittance of the mirror element is no less than 70%, and the band for which the near-infrared transmittance of the dark color mask member is no less than 70% have a band where they overlap each other.

According to this aspect of the present invention, since the mirror element has an integrating sphere reflectance of 40 to 60% in the visible range, a reflectance that meets the laws and regulations for a vehicle mirror can be obtained and in addition, glare like a cold mirror gives will not be given to drivers, so it is suitable for safe driving. Also, although the mirror element has transmission property because it has an integrating sphere reflectance of 40% to 60% in the visible range, a dark color mask member is arranged behind the mirror element, and consequently, the inside of the mirror cannot be seen through, which provide an improved appearance (design). Also, the near-infrared transmittance of the mirror element is no less than 70% for the whole or part of the band belonging to the near-infrared range within the entire sensitive wavelength range of the near-infrared camera, and the near-infrared transmittance of at least a region of the dark color mask member where the near-infrared camera is arranged is no less than 70% for the whole or part of the band belonging to the near-infrared range within the entire sensitive wavelength range of the near-infrared camera, and the band for which the near-infrared transmittance of the mirror element is no less than 70%, and the band for which the near-infrared transmittance of the dark color mask member is no less than 70% have a band where they overlap each other, making it possible to perform sufficient image pickup by means of the near-infrared camera.

This aspect of the present invention makes it possible that the at least a region of the dark color mask member where the near-infrared camera is arranged is formed of, for example, a visible-light absorption and near-infrared transmission filter attached to a back surface of the mirror element.

This aspect of the present invention further comprises a near-infrared lamp arranged behind the dark color mask member, and makes it possible that near-infrared light emitted from the near-infrared lamp is transmitted through the region of the dark color mask member with a near-infrared transmittance of no less than 70% and the mirror element, and released from a front surface of the mirror element. Accordingly, it is possible to pick up an image of an image pickup target by means of illumination by the near-infrared lamp even at night.

This aspect of the present invention makes it possible that a visible-range reflection peak wavelength of the mirror element is 500 nm to 550 nm. Accordingly, the effect of reducing the reflected light strength for both bluish short wavelength range light from a discharge lamp and a reddish long wavelength range light from a halogen lamp can be obtained while the reflectance that meets the laws and regulations for a vehicle mirror is ensured, making it possible to obtain a higher glare prevention effect.

This aspect of the present invention makes it possible that a reflecting film of the mirror element is formed of a laminated film including a high refractive index material film and a low refractive index material film. Accordingly, a mirror element having an integrating sphere reflectance of 40% to 60% in the visible range and having a near-infrared transmittance of no less than 70% for the whole or part of the band belonging to a near-infrared range within the entire sensitive wavelength range of the near-infrared camera, and furthermore, a mirror element with a reflection peak wavelength of 500 nm to 550 nm can easily be provided. For example, as a result of forming the high refractive index material film from a $TiO_2$ film, forming the low refractive index material film from an $SiO_2$ film, and making the number of deposited layers be three or four, a mirror element having an integrating sphere reflectance of 40% to 60% in the visible range, a near-infrared transmittance of no less than 70% for the whole or part of the band belonging to the near-infrared range within the entire sensitive wavelength range of the near-infrared camera, and a reflection peak wavelength of 500 nm to 550 nm can be provided. Also, the mirror having such characteristics has a smaller view angle dependency compared to a cold mirror, and accordingly a discontinuous part is hard to occur in the tone of reflected light.

This aspect of the present invention makes it possible that a hydrophilic functional layer containing a photocatalytic substance is formed on the front surface of the mirror element. Alternatively, the present invention makes it possible that a laminated film including a photocatalytic layer and a hydrophilic layer is formed on the front surface of the mirror element. Accordingly, a favorable vision can be ensured even in the rain.

Furthermore, another aspect of the present invention comprises: a mirror element with a reflecting film formed on a surface of a substrate formed of a dark color mask member; and a near-infrared camera arranged behind the mirror element, an optical axis of the near-infrared camera being directed to a surface of the mirror element, wherein: the reflecting film has an integrating sphere reflectance of 40% to 60% in the visible range and a near-infrared transmittance of no less than 70% for a whole or part of a band belonging to a near-infrared range within an entire sensitive wavelength range of the near-infrared camera; a near-infrared transmittance of at least a region of the substrate where the near-infrared camera is arranged is no less than 70% for a whole or part of a band belonging to a near-infrared range within the entire sensitive wavelength range of the near-infrared camera; and the band for which the near-infrared transmittance of the reflecting film is no less than 70%, and the band for which the near-infrared transmittance of the substrate is no less than 70% have a band where they overlap each other.

DETAILED DESCRIPTION OF THE PREFERRED EMBODIMENTS

Figure 2:
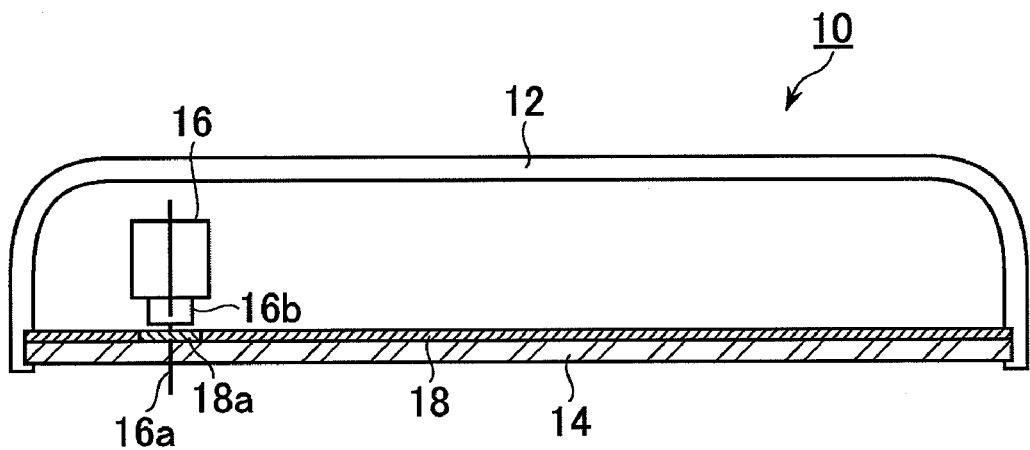
FIG. 2 is a diagram illustrating an overview of an inner structure of a vehicle inner mirror in which the present invention is employed, which is a cross-sectional plane view of a housing and a mirror element.
Figure 3:
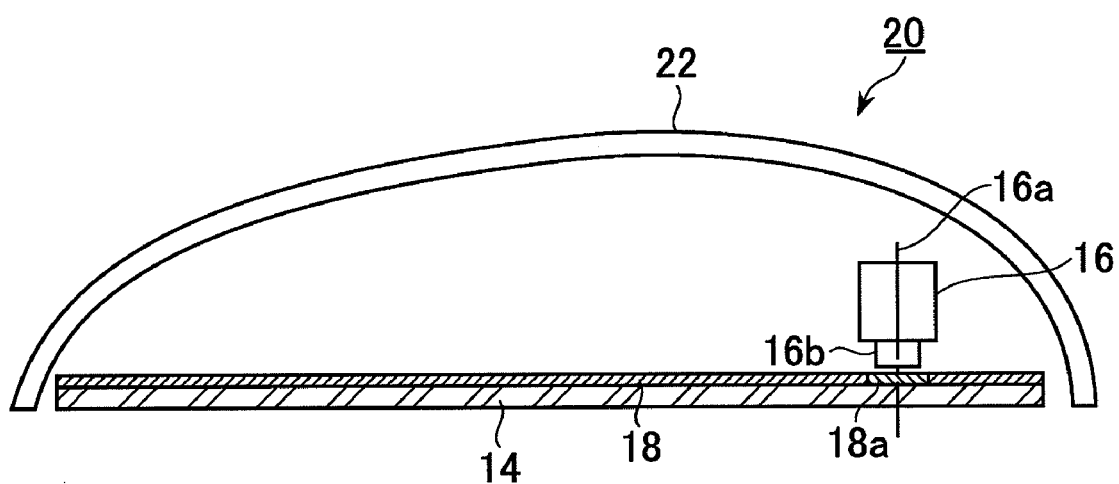
FIG. 3 is a diagram illustrating an overview of an inner structure of a vehicle outer mirror in which the present invention is employed, which is a cross-sectional view of a housing and a mirror element.

An embodiment of the present invention will be described below. FIGS. 2 and 3 each show an overview of an inner structure of a vehicle mirror in which the present invention is employed. FIG. 2 shows an inner mirror, and FIG. 3 shows an outer mirror. Each of the Figures is a cross-sectional plane view of a housing and a mirror element. In FIG. 2, an inner mirror 10 has a mirror element 14 attached to a front opening of a housing 12. The mirror element 14 has an integrating sphere reflectance of 40% to 60% in the visible range, and its near-infrared transmittance is set to no less than 70% for the whole or part of the band belonging to the near-infrared range within the entire sensitive wavelength range of a near-infrared camera 16, which will be described later. Also, the visible-range reflection peak wavelength of the mirror element 14 is 500 nm to 550 nm. Within the housing 12, the near-infrared camera 16 is arranged behind the mirror element 14. An optical axis 16a of the near-infrared camera 16 faces a surface of the mirror element 14 and is directed to the rear area in the vehicle. A black mask member 18 (i.e., a dark color mask member) is attached to the entire back surface of the mirror element 14. A region corresponding to the image pickup area for the near-infrared camera 16 (area for image pickup by a lens unit 16b) within the entire region of the black mask member 18 consists of a visible-light absorption and near-infrared transmission filter 18a (IR filter). The visible-light absorption and near-infrared transmission filter 18a absorbs visible light and transmits near-infrared light. The near-infrared transmittance of the visible-light absorption and near-infrared transmission filter 18a is set to no less than 70% for the whole or part of the band belonging to the near-infrared range within the entire sensitive wavelength range of the near-infrared camera 16. The band for which the near-infrared transmittance of the mirror element 14 is no less than 70% and the band for which the near-infrared transmittance of the visible-light absorption and near-infrared transmission filter 18a is no less than 70% have a band where they overlap each other. The region of the black mask member 18 other than the visible-light absorption and near-infrared transmission filter 18a absorbs both visible-range light and near-infrared-range light. The entire region of the black mask member 18 can also be formed of a visible-light absorption and near-infrared transmission filter. The near-infrared camera 16 picks up an image of the sight of the rear area in the vehicle by receiving light transmitted through the mirror element 14 and the visible-light absorption and near-infrared transmission filter 18a. The picked-up image is displayed on a television monitor installed in the vicinity of the driver's seat. The driver can monitor the inside of the vehicle by viewing the image.

An outer mirror 20, which is shown in FIG. 3, has a similar configuration. The parts in common to those of the inner mirror 10 shown in FIG. 2 are provided with the same reference numerals. The outer mirror 20 has a mirror element 14 attached to a front opening of a housing 22. Within the housing 22, a near-infrared camera 16 is arranged behind the mirror element 14. An optical axis 16a of the near-infrared camera 16 faces a surface of the mirror element 14 and is directed to the rear area outside the vehicle. A black mask member 18 is attached to the entire back surface of the mirror element 14. A region corresponding to the image pickup region for the near-infrared camera 16 (the region for image pickup by a lens unit 16b) within the entire region of the black mask member 18 consists of a visible-light absorption and near-infrared transmission filter 18a. The entire region of the black mask member 18 can also be formed of a visible-light absorption and near-infrared transmission filter. The near-infrared camera 16 picks up an image of the sight of the rear area outside the vehicle by receiving light transmitted through the mirror element 14 and the visible-light absorption and near-infrared transmission filter 18a. The picked-up image is displayed on a television monitor installed in the vicinity of the driver's seat. The driver can check the state of the blind spot not reflected in the mirror element 14 by viewing that image.

Figure 1:
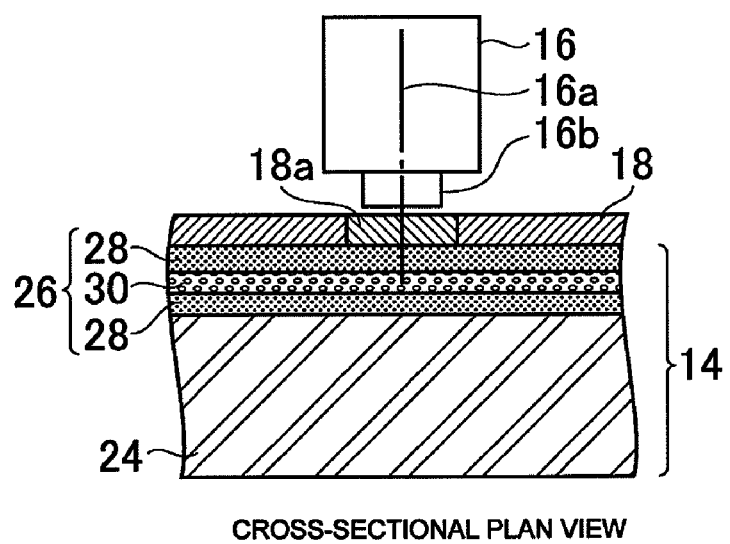
FIGS. 1(A) and 1(B) are diagrams illustrating an embodiment of the present invention, which are enlarged cross-sectional plane and front views of a configuration of a main part of a rear-view mirror 10 or 20 shown in FIG. 2 or 3.
Figure 1:
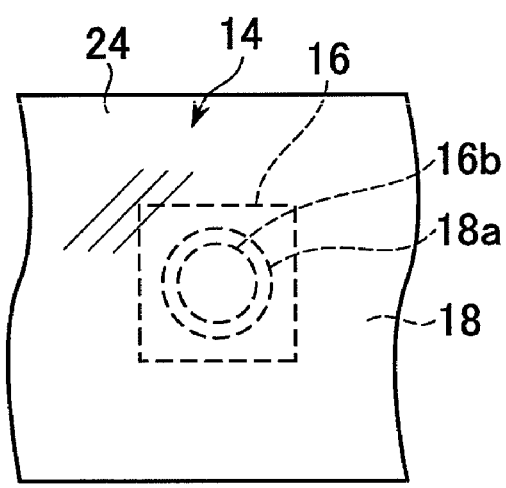

An enlarged view of a main part of the rear-view mirror 10 or 20 shown in FIG. 2 or 3 is shown in FIG. 1(A) (the thicknesses of the individual layers are schematically shown). FIG. 1(B) is a front view thereof. The mirror element 14 is constructed by forming a reflecting film 26 on a back surface of a transparent glass substrate 24. In FIG. 1, the reflecting film 26 is formed of a dielectric multilayer film having three-layers, i.e., high refractive index material films 28 and a low refractive index material film 30, alternately deposited. An example design where the high refractive index material films 28 are formed of $TiO_2$ and the low refractive index material film 30 is formed of $SiO_2$ is shown in Table 1.

TABLE 1

| Layer number | Material | Refractive index | Attenuation coefficient | Optical thickness |
|---|---|---|---|---|
|  | (Air layer) | 1.00000 | 0.00000 |  |
| 1 | $TiO_2$ | 2.33186 | 0.00025 | $0.250\lambda_0$ |
| 2 | $SiO_2$ | 1.46085 | 0.00000 | $0.250\lambda_0$ |
| 3 | $TiO_2$ | 2.33186 | 0.00025 | $0.250\lambda_0$ |
|  | (Transparent glass substrate) | 1.51958 | 0.00000 |  |

(Incident angle = 0.00°, Reference wavelength $\lambda_0$ = 530.00 nm)

Figure 4:
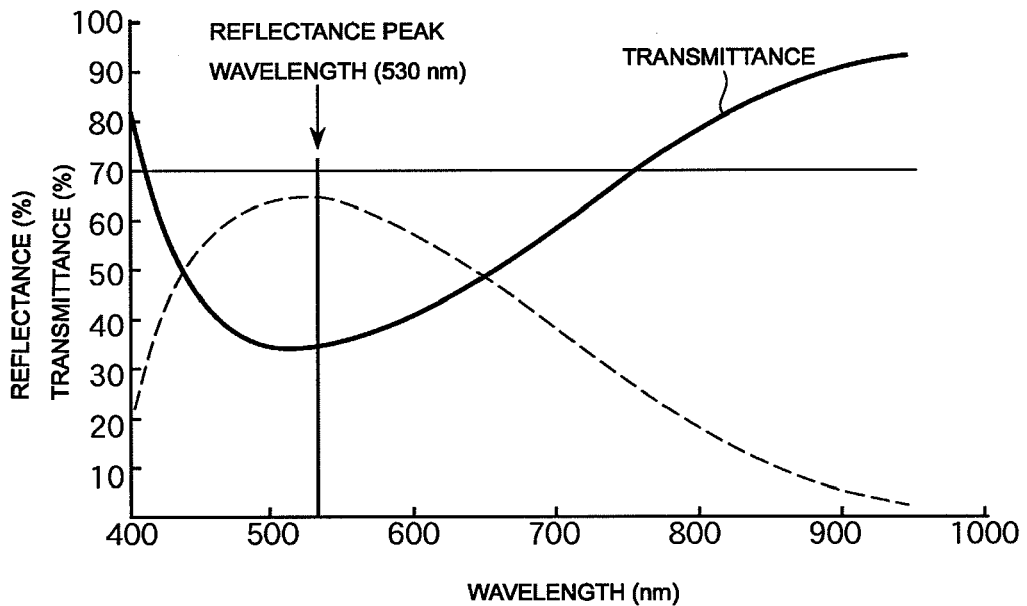
FIG. 4 is a diagram indicating reflectance and transmittance characteristics of a mirror element according to a design shown in Table 1.

A reflectance characteristic and a transmittance characteristic of the mirror element 14 according to the design indicated in Table 1 is shown in FIG. 4. This design ensures that the integrating sphere reflectance of the mirror element 14 in the visible range (390 nm to 780 nm) is no less than 50% (approximately 65%). Thus, a reflectance that meets the laws and regulations for a vehicle mirror can be obtained. Also, it ensures that the reflection peak wavelength in the visible-range is approximately 530 nm, and the reflectance at the peak wavelength is approximately 65%. Accordingly, glare like a cold mirror gives will not be given to drivers. Also, since the reflectance gently decreases at both sides of the reflection peak wavelength, it is possible to reduce the reflected light strength for both bluish short-wavelength range light from a discharge lamp and reddish long wavelength range light from a halogen lamp, making it possible to obtain a higher glare prevention effect. Also, according to the aforementioned design, a transmittance of no less than 70% is obtained for a band of approximately no less than 750 nm. In the characteristics shown in FIG. 4, when the transmittance is no less than 70%, the band partially includes a visible light range (approximately 750 nm to 780 nm), but it is also possible to design the mirror element 14 so as to achieve a transmittance of no less than 70% only for a band of no less than 780 nm, not including the visible light range. Also, when the high refractive index material film 28 of the reflecting film 26 is formed of $TiO_2$ and the low refractive index material film 30 is formed of $SiO_2$, the integrating sphere reflectance in the visible range exceeds 60% if five or more layers are deposited, resulting in that headlight from behind makes a driver have the feeling of glare at night. Furthermore, as the number of layers increases, the spectral shape of the reflected light sharply changes, and as a result, problems arise, for example, in that the mirror element 14 provides no natural tone and becomes unsuitable for a mirror, and moreover, and that its view angle dependency increases, causing a discontinuous part in the tone of reflected light. Therefore, three or four layers are suitable for the laminated layers.

The region excluding the visible-light absorption and near-infrared transmission filter 18a of the entire region of the black mask member 18 only need to have a function that prevents the inside of the mirror from being seen through from the outside, and accordingly, it may have a low transmittance for visible light and near-infrared light, and can be formed from a black film or a black coating material, etc.

While the visible-light absorption and near-infrared transmission filter 18a is apparently black and can shield visible light (absorb visible light), it have the property of transmitting near-infrared light. The visible-light absorption and near-infrared transmission filter 18a is formed by, for example, dispersing a light-absorbing substance in a resin or glass, and is made in the shape of a film, a plate (resin plate or glass plate), a coating material, etc. For the film or plate-shaped ones, ones commercially available in the name of "IR filter", "infrared transmission filter" or "infrared transmission and visible light absorption filter," etc., can be used. The visible-light absorption and near-infrared transmission filter 18a can be attached to the back surface of the mirror element 14 using a mirror holder if it is in the shape of a film or a plate. In other words, in the case of the inner mirror 10 shown in FIG. 2, as shown in that Figure, the visible-light absorption and near-infrared transmission filter 18a can be attached to the back surface of the mirror element 14 by putting the peripheral portion of the visible-light absorption and near-infrared transmission filter 18a and the peripheral portion of the mirror element 14 together in the housing 12 constituting a mirror holder. Also, in the case of the outer mirror 20 shown in FIG. 3, the visible-light absorption and near-infrared transmission filter 18a can be attached to the back surface of the mirror element 14 by putting the visible-light absorption and near-infrared transmission filter 18a and the mirror element 14 together in a mirror holder (not shown) holding the mirror element 14. The visible-light absorption and near-infrared transmission filter 18a can be attached to the back surface of the mirror element 14 by applying it to the back surface if it is a coating material.

Figure 5:
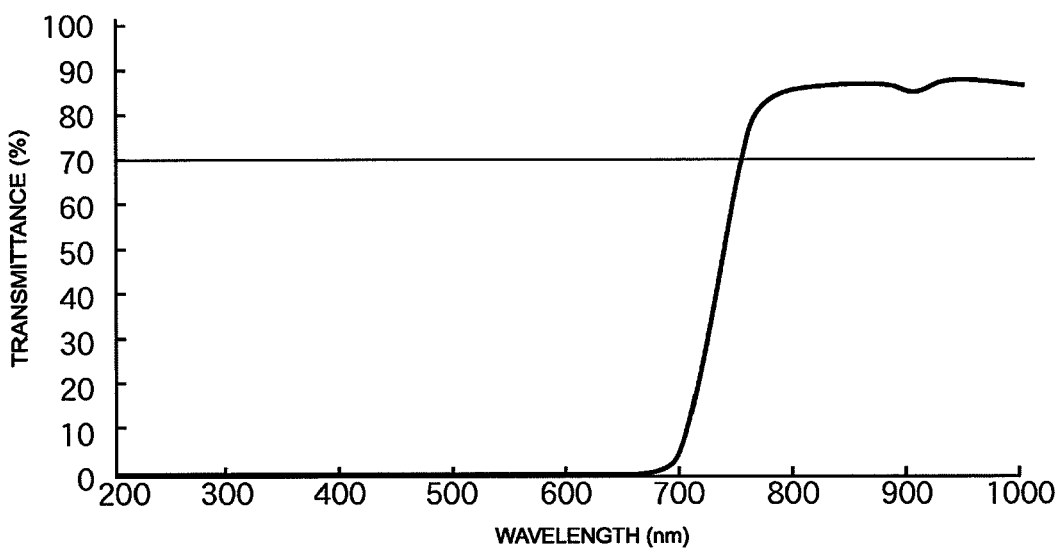
FIG. 5 is a diagram indicating an example transmittance characteristic of a visible-light absorption and near-infrared transmission filter.

An example transmittance characteristic of the visible-light absorption and near-infrared transmission filter 18a is shown in FIG. 5. Using the visible-light absorption and near-infrared transmission filter 18a having this characteristic, many components in the visible range (390 nm to 780 nm) can be absorbed and a transmittance of no less than 70% can be obtained for the near-infrared range of no less than 780 nm. In the characteristic shown in FIG. 5, when the transmittance becomes no less than 70%, the band partially includes a visible light range (approximately 750 nm to 780 nm), but it is also possible to design the mirror element 14 so as to achieve a transmittance of no less than 70% only for a band of no less than 780 nm, not including the visible light range.

Figure 6:
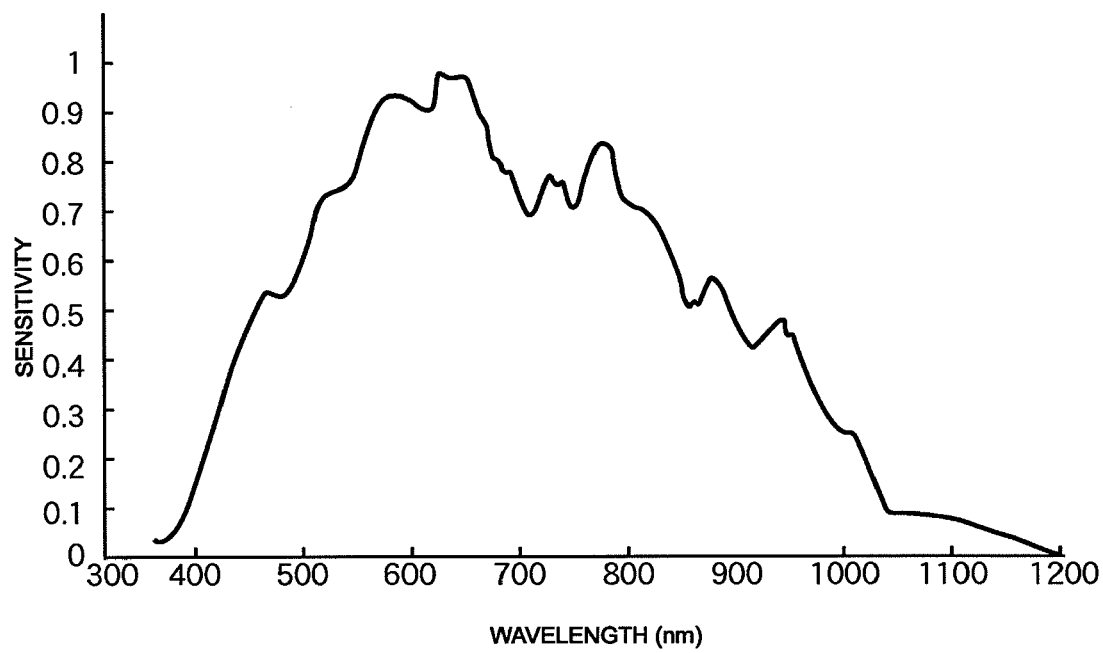
FIG. 6 is a diagram indicating an example sensitivity of a near-infrared camera.

For the near-infrared camera 16, commercially-available one can be used. An example sensitivity characteristic of a commercially-available near-infrared camera is shown in FIG. 6. The sensitive wavelength range of this near-infrared camera is approximately 300 nm to 1200 nm. When a mirror element 14 having the transmittance property shown in FIG. 4, a visible-light absorption and near-infrared transmission filter 18a having the transmittance characteristic shown in FIG. 5 and a near-infrared camera 16 having the sensitivity characteristic shown in FIG. 6 are used in combination, the mirror element 14 and the visible-light absorption and near-infrared transmission filter 18a each have a near-infrared (no less than 780 nm) transmittance of no less than 70% for the whole band (which may also be a part of the band) belonging to the near-infrared range within the entire sensitive wavelength range of the near-infrared camera 16, enabling sufficient near-infrared light image pickup.

As described above, by attaching the black mask member 18 to the back surface of the mirror element 14, the inside of the vehicle mirror cannot be seen through even though the mirror element 14 has transmission property in the visible range, providing a favorable appearance (design). Also, since the region corresponding to the area for image pickup by the near-infrared camera 16 within the entire region of the black mask member 18 is formed of the visible-light absorption and near-infrared transmission filter 18a, image-pickup by the near-infrared camera 16 is not hindered.

Figure 7:
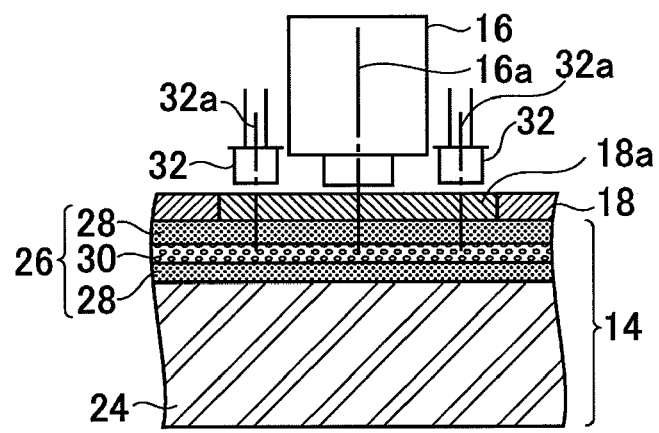
FIG. 7 is a cross-sectional plane view of a main part of a rear-view mirror according to another embodiment of the present invention.

Another embodiment of the present invention will be described below. FIG. 7 shows the rear-view mirror 10 or 20 shown in FIG. 2 or 3 with a near-infrared lamp 32 arranged behind the mirror element 14 having the black mask member 18 attached thereto. The parts in common to those in FIG. 1 are provided with the same reference numerals. Within the housing 12 (FIG. 2) or 22 (FIG. 3), one or more near-infrared lamps 32 are provided behind the mirror element 14 and adjacent to the near-infrared camera 16. The near-infrared lamp 32 is formed of, for example, a near-infrared LED. The wavelength of light emitted from the near-infrared lamp 32 is set to a wavelength within a band, in the near-infrared range, which provides favorable sensitivity for the near-infrared camera 16, and for which the transmittances of the reflecting film 26 and the visible-light absorption and near-infrared transmission filter 18a are both no less than 70%. An optical axis 32a of the near-infrared lamp 32 faces the surface of the mirror element 14 in parallel to the optical axis 16a of the near-infrared camera 16, and is directed to the rear area in the vehicle or the rear area outside the vehicle. The region corresponding to the area for image-pickup by the near-infrared camera 16 within the entire region of the black mask member 18 and the region facing the near-infrared lamp 32 are formed of the visible-light absorption and near-infrared transmission filter 18a. The other configuration is the same as that in FIG. 1.

According to the aforementioned configuration, near-infrared light emitted from the near-infrared lamp 32 is applied to an image pickup target in the rear area in the vehicle or outside the vehicle via the visible-light absorption and near-infrared transmission filter 18a and the mirror element 14. The near-infrared camera 16 picks up an image of the sight of the rear area outside the vehicle illuminated with the near-infrared lamp 32 by receiving light transmitted through the mirror element 14 and the visible-light absorption and near-infrared transmission filter 18a. Consequently, it is possible to pick up an image of the image pickup target by means of light applied by the near-infrared lamp 32 even at night. The picked-up image is displayed on a television monitor installed in the vicinity of the driver's seat. The driver can monitor the inside of the vehicle or check the state of the blind spot outside the vehicle not reflected in the mirror element 14 by viewing that image.

Figure 8:
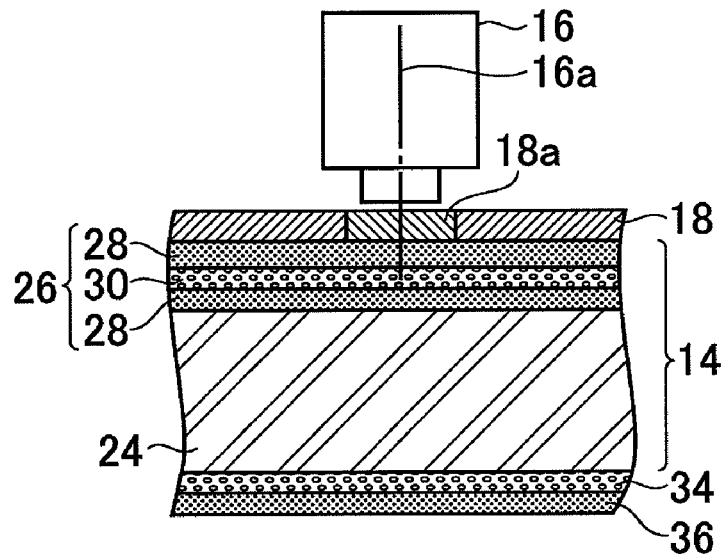
FIG. 8 is a cross-sectional plane view of a main part of a rear-view mirror according to another embodiment of the present invention.

FIG. 8 shows the rear-view mirror 10 or 20 shown in FIG. 2 or 3 with a laminated film of a photocatalytic layer 34 and a hydrophilic layer 36 formed on the front surface of the mirror element 14. The parts in common to those in FIG. 1 are provided with the same reference numerals. On the front surface of the mirror element 14, a $TiO_2$ film is formed as the photocatalytic layer 34, and a porous $SiO_2$ film is deposited on the $TiO_2$ film as the hydrophilic layer 36. According to the aforementioned configuration, since water droplets adhering to the mirror surface spread in the shape of a thin film by means of the hydrophilic property of the hydrophilic layer 36, a good visibility can be ensured even in the rain. Also, where organic compounds stick to the surface of the hydrophilic layer 36, the organic compounds are decomposed and removed by means of a photocatalytic reaction of the underlying photocatalytic layer 34, and accordingly, the hydrophilic property of the hydrophilic layer 36 is maintained.

Figure 9:
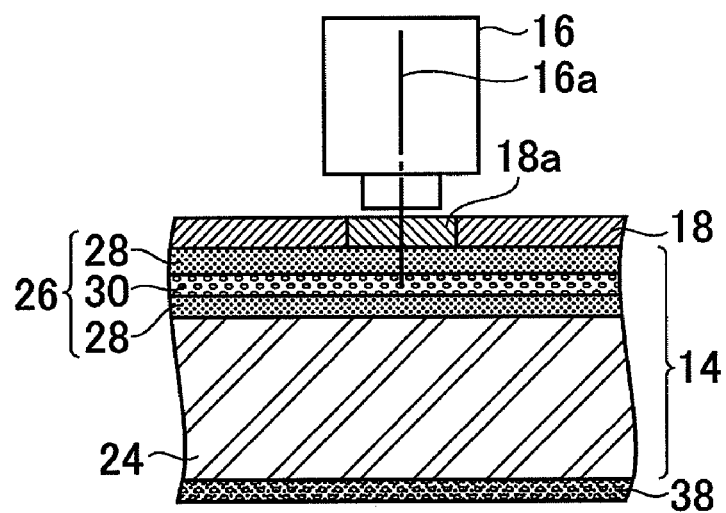
FIG. 9 is a cross-sectional plane view of a main part of a rear-view mirror according to another embodiment of the present invention.

FIG. 9 shows the rear-view mirror 10 or 20 shown in FIG. 2 or 3 with a mixed layer 38 of a photocatalytic material and a hydrophilic material formed on the front surface of the mirror element 14. The parts in common to those in FIG. 1 are provided with the same reference numerals. On the front surface of the mirror element 14, a mixed layer 38 of $TiO_2$, which is a photocatalytic material, and $SiO_2$, which is a hydrophilic material, is formed. According to the aforementioned configuration, since water droplets adhering to the mirror surface spread in the shape of a thin film by means of the hydrophilic property of the hydrophilic material existing on the surface of the mixed layer 38, a good visibility can be ensured even in the rain. Also, where organic compounds stick to the surface of the mixed layer 38, the organic compounds are decomposed and removed by means of a photocatalytic reaction of the photocatalytic material in the mixed layer 38, and accordingly, the hydrophilic property of the mixed layer 38 is maintained.

Figure 10:
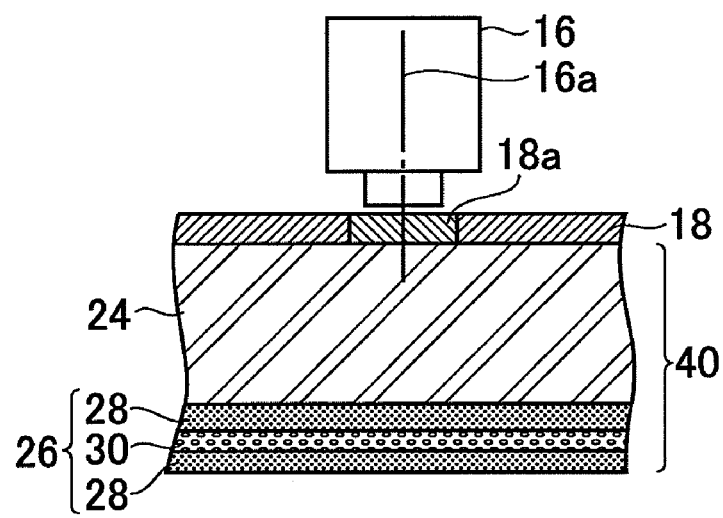
FIG. 10 is a cross-sectional plane view of a main part of a rear-view mirror according to another embodiment of the present invention.

FIG. 10 shows the rear-view mirror 10 or 20 shown in FIG. 2 or 3 with a reflecting film 26 arranged on the mirror surface side. The parts in common to those in FIG. 1 are provided with the same reference numerals. In a mirror element 40, a reflecting film 26 having three layers consisting of high refractive index material films 28 and a low refractive index material film 30 alternately deposited is formed on a surface of the transparent glass substrate 24. The black mask member 18 is attached to the entire back surface of the mirror element 40. The region corresponding to the area for image-pickup by the near-infrared camera 16 within the entire region of the black mask member 18 is formed of the visible-light absorption and near-infrared transmission filter 18a.

Figure 11:
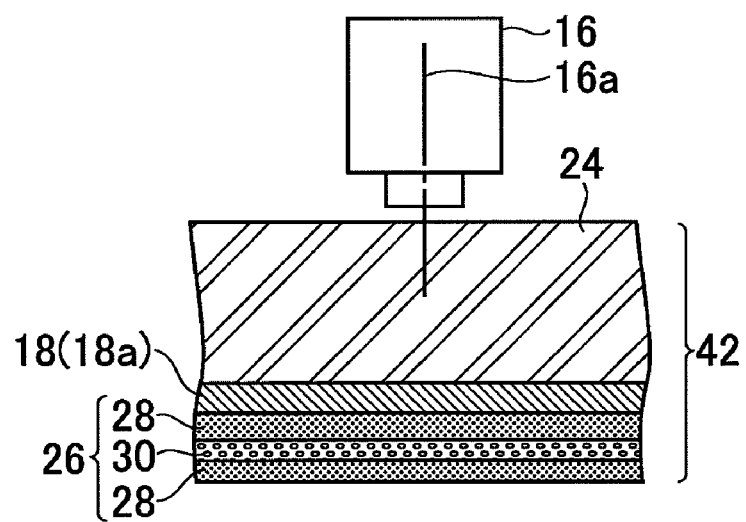
FIG. 11 is a cross-sectional plane view of a main part of a rear-view mirror according to another embodiment of the present invention.

FIG. 11 shows the rear-view mirror 10 or 20 shown in FIG. 2 or 3 with the reflecting film 26 arranged on the mirror surface side and with the black mask member 18 provided between the transparent glass substrate 24 and the reflecting film 26. The parts in common to those in FIG. 1 are provided with the same reference numerals. In a mirror element 42, the black mask member 18 is attached to a surface of the transparent glass substrate 24. The entire region of the black mask member 18 is formed of the visible-light absorption and near-infrared transmission filter 18a. Alternatively, the region corresponding to the area for image-pickup by the near-infrared camera 16 within the entire region of the black mask member 18 can also be formed of a visible-light absorption and near-infrared transmission filter (the other area is formed of a dark color mask member that absorbs both visible-range light and near-infrared-range light). On a surface of the black mask member 18, a reflecting film 26 is formed by three layers consisting of the high refractive index material films 28 and the low refractive index material film 30, which are alternately deposited.

Figure 12:
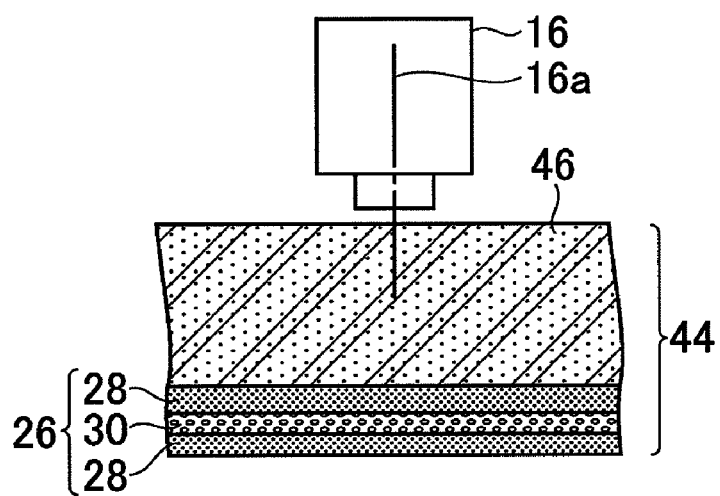
FIG. 12 is a cross-sectional plane view of a main part of a rear-view mirror according to another embodiment of the present invention.

FIG. 12 shows the rear-view mirror 10 or 20 shown in FIG. 2 or 3 with the reflecting film 26 arranged on the mirror surface side and with a substrate 46 itself formed of a dark color mask member. The parts in common to those in FIG. 1 are provided with the same reference numerals. In a mirror element 44, the substrate 46 is formed of a plate-shaped member that is also used as a dark color mask member. In other words, the entire region of the substrate 46 is formed of a plate-shaped (resin plate or glass plate) visible-light absorption and near-infrared transmission filter. Alternatively, the region corresponding to the area for image-pickup by the near-infrared camera 16 within the entire region of the substrate 46 can be formed of a plate-shaped (resin plate or glass plate) visible-light absorption and near-infrared transmission filter (the other area can be formed of a plate-shaped [resin plate or glass plate] dark color mask member that absorbs both visible-range light and near-infrared-range light). The near-infrared transmittance of the region of the substrate 46 formed of the visible-light absorption and near-infrared transmission filter is set to no less than 70% (for example, the characteristic indicated in FIG. 5) for the whole or part of the band belonging to the near-infrared range within the sensitive wavelength range of the near-infrared camera 16 (the sensitivity characteristic of the near-infrared camera 16 is, for example, one indicated in FIG. 6). On a surface of the substrate 46, a reflecting film 26 is formed by three layers of high refractive index material films 28 and low refractive index material film 30 alternately deposited. The near-infrared transmittance of the reflecting film 26 is set to no less than 70% (for example, the characteristic indicated in FIG. 4) for the whole or part of the band belonging to the near-infrared region within the entire sensitive wavelength range of the near-infrared camera 16. The band for which the near-infrared transmittance of the reflecting film 26 is no less than 70% and the band for which the near-infrared transmittance of the region of the substrate 46 formed of a visible-light absorption and near-infrared transmission filter is no less than 70% have a band where they overlap each other.

Also, in the rear-view mirrors shown in FIGS. 8 to 12, as in FIG. 7, it is possible that a near-infrared lamp is arranged behind the mirror element and that at least the region facing the near-infrared camera and the near-infrared lamp within the entire region of the dark color mask member can be made to transmit near-infrared light (it is also possible to make the entire region transmit near-infrared light).

Also, in the near-infrared camera, a near-infrared transmission band pass filter may be arranged in front of an objective lens for filtering out noise. The transmission band of this near-infrared transmission band pass filter is set according to the wavelength of light emitted by a near-infrared lamp (near-infrared LED) which is used in combination of the near-infrared camera. Currently, 880 nm is predominant for the wavelength of light emitted by the near-infrared LED used in combination of the near-infrared camera, in consideration of, for example, the sensitivity of the near-infrared camera deteriorating where it is no less than 900 nm and some people being able to recognize light of no more than 820 nm, and in line with this, 880 nm±20 nm is predominant for the transmission band of the near-infrared transmission band pass filter. However, in recent years, a near-infrared CCD camera that ensures sufficient sensitivity up to around 1100 nm and a near-infrared LED that emits light with a wavelength of 950 nm have been developed. Also, in the image pickup device-equipped rear-view mirror according to the present invention, a near-infrared camera having a near-infrared transmission band pass filter attached thereto can be used. In that case, the transmission bands of the mirror element and the mask member can be set according to the transmission band of the near-infrared transmission band pass filter. For example, when the near-infrared transmittances of the mirror element and the mask member are set to no less than 70% for the entire band of 800 nm to 1000 nm, it is possible to use the mirror element and the mask member in combination of most of commercially-available near-infrared cameras having a near-infrared transmission band pass filter attached thereto, when the transmittances are set to no less than 70% for the entire band of 850 nm to 900 nm, it is possible to use the mirror element and the mask member in combination of a currently-predominant near-infrared camera having a near-infrared transmission band pass filter attached thereto, and when the transmittances are set to 800 nm to 1100 nm, it is possible to use the mirror element and the mask member in combination of most of near-infrared cameras having a near-infrared transmission band pass filter attached thereto, including the aforementioned near-infrared CCD camera that ensures sufficient sensitivity up to around 1100 nm. Also, when those having the characteristics shown in FIGS. 4, 5 and 6 are used in combination, if the inside of the mirror is somewhat see-through, it is possible to surely prevent the inside of the mirror from being seen through by, for example, using an 880 nm±20 nm near-infrared transmission bandpass filter as well (for the near-infrared lamp 32, an near-infrared LED with an emission wavelength of 880 nm is used) (According to FIG. 6, the near-infrared camera 16 can obtain a sufficient sensitivity, which is approximately 50% of the sensitivity peak value, with 880 nm±20 nm).

What is claimed is:

1. An image pickup device-equipped rear-view mirror, comprising:
   a mirror element, comprising a dielectric multilayer reflecting film formed on a rear surface of a substrate, the reflecting film consisting of three or four laminated layers, including at least one high refractive index material film layer and at least one low refractive index material film layer;
   a dark color mask member arranged behind the mirror element such that the rear surface of the substrate faces the dark color mask member; and
   a near-infrared camera arranged behind the dark color mask member, an optical axis of the near-infrared camera being directed to a surface of the mirror element via the dark color mask member, wherein:
   the mirror element has an integrating sphere reflectance of 40% to 60% in a visible wavelength range, and a near-infrared transmittance of no less than 70% in a near-infrared wavelength range within a sensitive wavelength range of the near-infrared camera;
   a near-infrared transmittance of at least a region of the dark color mask member where the near-infrared camera is arranged is no less than 70% in a near-infrared wavelength range within a sensitive wavelength range of the near-infrared camera; and
   the near-infrared wavelength range in which the mirror element has a near-infrared transmittance of no less than 70% overlaps with the near-infrared wavelength range in which the near-infrared transmittance of the region of the dark color mask member is no less than 70%.

2. The image pickup device-equipped rear-view mirror according to claim 1, wherein the at least a region of the dark color mask member where the near-infrared camera is arranged is formed of a visible-light absorption and near-infrared transmission filter attached to a back surface of the mirror element.

3. The image pickup device-equipped rear-view mirror according to claim 1, further comprising a near-infrared lamp arranged behind the dark color mask member, wherein near-infrared light emitted from the near-infrared lamp is transmitted through the region of the dark color mask member with a near-infrared transmittance of no less than 70% and the mirror element, and released from a front surface of the mirror element.

4. The image pickup device-equipped rear-view mirror according to claim 2, further comprising a near-infrared lamp arranged behind the dark color mask member, wherein near-infrared light emitted from the near-infrared lamp is transmitted through the region of the dark color mask member with a near-infrared transmittance of no less than 70% and the mirror element, and released from a front surface of the mirror element.

5. The image pickup device-equipped rear-view mirror according to claim 1, wherein a visible-range reflection peak wavelength of the mirror element is 500 nm to 550 nm.

6. The image pickup device-equipped rear-view mirror according to claim 2, wherein a visible-range reflection peak wavelength of the mirror element is 500 nm to 550 nm.

7. The image pickup device-equipped rear-view mirror according to claim 3, wherein a visible-range reflection peak wavelength of the mirror element is 500 nm to 550 nm.

8. The image pickup device-equipped rear-view mirror according to claim 4, wherein a visible-range reflection peak wavelength of the mirror element is 500 nm to 550 nm.

9. The image pickup device-equipped rear-view mirror according to claim 1, wherein the high refractive index material film is a $TiO_2$ film and the low refractive index material film is an $SiO_2$ film.

10. The image pickup device-equipped rear-view mirror according to claim 1, wherein a hydrophilic functional layer containing a photocatalytic substance is formed on the front surface of the mirror element.

11. The image pickup device-equipped rear-view mirror according to claim 1, wherein a laminated film including a photocatalytic layer and a hydrophilic layer is formed on the front surface of the mirror element.

12. The image pickup device-equipped rear-view mirror according to claim 1, wherein a first layer of the dielectric multilayer reflecting film, which is formed on the rear surface of the substrate, is formed of a high refractive index material film.

13. The image pickup device-equipped rear-view mirror according to claim 12, wherein the first layer of the dielectric multilayer reflecting film comprises a $TiO_2$ film.

* * * * *